(12) United States Patent
Malchow et al.

(10) Patent No.: US 10,695,860 B2
(45) Date of Patent: Jun. 30, 2020

(54) ULTRASONIC ANVIL HAVING LOW TRANSMISSIBILITY

(71) Applicant: KIMBERLY-CLARK WORLDWIDE, INC., Neenah, WI (US)

(72) Inventors: Gregory L. Malchow, Oshkosh, WI (US); Gregory John Rajala, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 299 days.

(21) Appl. No.: 15/771,117

(22) PCT Filed: Oct. 29, 2015

(86) PCT No.: PCT/US2015/058041
§ 371 (c)(1),
(2) Date: Apr. 26, 2018

(87) PCT Pub. No.: WO2017/074383
PCT Pub. Date: May 4, 2017

(65) Prior Publication Data
US 2019/0001430 A1    Jan. 3, 2019

(51) Int. Cl.
*B23K 20/10*   (2006.01)
*B26D 7/08*    (2006.01)
(Continued)

(52) U.S. Cl.
CPC .............. *B23K 20/10* (2013.01); *B26D 7/086* (2013.01); *B26D 7/204* (2013.01); *B29C 65/085* (2013.01);
(Continued)

(58) Field of Classification Search
CPC ..... B23K 20/10; B23K 20/106; B23K 20/126
(Continued)

(56) References Cited

U.S. PATENT DOCUMENTS 3,586,122 A * 6/1971 Jacke ................... B23K 20/106
                                                        181/205
3,765,589 A * 10/1973 Walraven ............... B23K 11/12
                                                        228/1.1
(Continued)

FOREIGN PATENT DOCUMENTS

CN          1620343 A      5/2005
CN        104203387 A     12/2014
(Continued)

*Primary Examiner* — Erin B Saad
(74) *Attorney, Agent, or Firm* — Kimberly-Clark Worldwide, Inc.

(57) ABSTRACT

An anvil system for use in an ultrasonic bonder includes an anvil assembly including an anvil bar having an anvil aperture in at least one anvil bar longitudinal end, the anvil aperture having an anvil aperture inner surface, a shaft separate from the anvil bar and partially disposed in the anvil aperture, the shaft having a circumferential surface and extending outwardly beyond the anvil bar longitudinal end, and a first elastomeric shaft O-ring disposed on the shaft between the shaft circumferential surface and the anvil aperture inner surface; a mounting bracket with a mounting bracket hole having a hole surface; a bushing disposed in the mounting bracket hole and sized to accommodate an end of the shaft, the bushing having a bushing inner surface; and a second elastomeric shaft O-ring disposed on the shaft between the shaft circumferential surface and the bushing inner surface.

20 Claims, 7 Drawing Sheets

(51) Int. Cl.
*B26D 7/20* (2006.01)
*B29C 65/00* (2006.01)
*B29C 65/08* (2006.01)
*B31B 70/64* (2017.01)
*B29L 31/48* (2006.01)

(52) U.S. Cl.
CPC .......... *B29C 66/1122* (2013.01); *B29C 66/43* (2013.01); *B29C 66/73921* (2013.01); *B29C 66/8163* (2013.01); *B29C 66/81611* (2013.01); *B29C 66/8362* (2013.01); *B29C 66/9512* (2013.01); *B29C 66/9513* (2013.01); *B29C 66/9592* (2013.01); *B29L 2031/4878* (2013.01); *B31B 70/64* (2017.08)

(58) Field of Classification Search
USPC .......................................... 228/1.1, 112.1, 2.1
See application file for complete search history.

(56) References Cited

U.S. PATENT DOCUMENTS

| | | | |
|---|---|---|---|
| 4,080,229 A | 3/1978 | Williams | |
| 4,333,791 A * | 6/1982 | Onishi | B29C 65/087 |
| | | | 156/580.1 |
| 4,455,903 A | 6/1984 | Kesten | |
| 4,647,336 A * | 3/1987 | Coenen | B06B 3/00 |
| | | | 116/137 A |
| 4,650,530 A | 3/1987 | Mahoney | |
| 5,242,529 A * | 9/1993 | Riedel | B23K 20/10 |
| | | | 156/580.1 |
| 5,552,013 A | 9/1996 | Ehlert | |
| 5,660,679 A | 8/1997 | Rajala | |
| 5,667,608 A | 9/1997 | Rajala | |
| 6,123,792 A | 9/2000 | Samida | |
| 6,368,437 B1 | 4/2002 | Ziegelhoffer | |
| 6,537,403 B1 | 3/2003 | Blenke | |
| 7,828,192 B2 | 11/2010 | Pochardt | |
| 2002/0062902 A1 | 5/2002 | Couillard | |
| 2003/0066863 A1* | 4/2003 | Skogsmo | B23K 20/106 |
| | | | 228/111.5 |
| 2005/0037261 A1 | 2/2005 | Inoue | |
| 2008/0099533 A1* | 5/2008 | Hanlon | B23K 20/122 |
| | | | 228/112.1 |
| 2009/0250505 A1 | 10/2009 | Matlack | |
| 2011/0284169 A1 | 11/2011 | Khakhalev | |
| 2018/0222123 A1* | 8/2018 | Tamamoto | B29C 66/41 |

FOREIGN PATENT DOCUMENTS

| | | |
|---|---|---|
| GB | 1491619 A | 11/1977 |
| JP | 2001205452 A2 | 7/2001 |
| WO | 9938667 A2 | 8/1999 |
| WO | 2006041380 A1 | 4/2006 |
| WO | 06045595 A1 | 5/2006 |

* cited by examiner

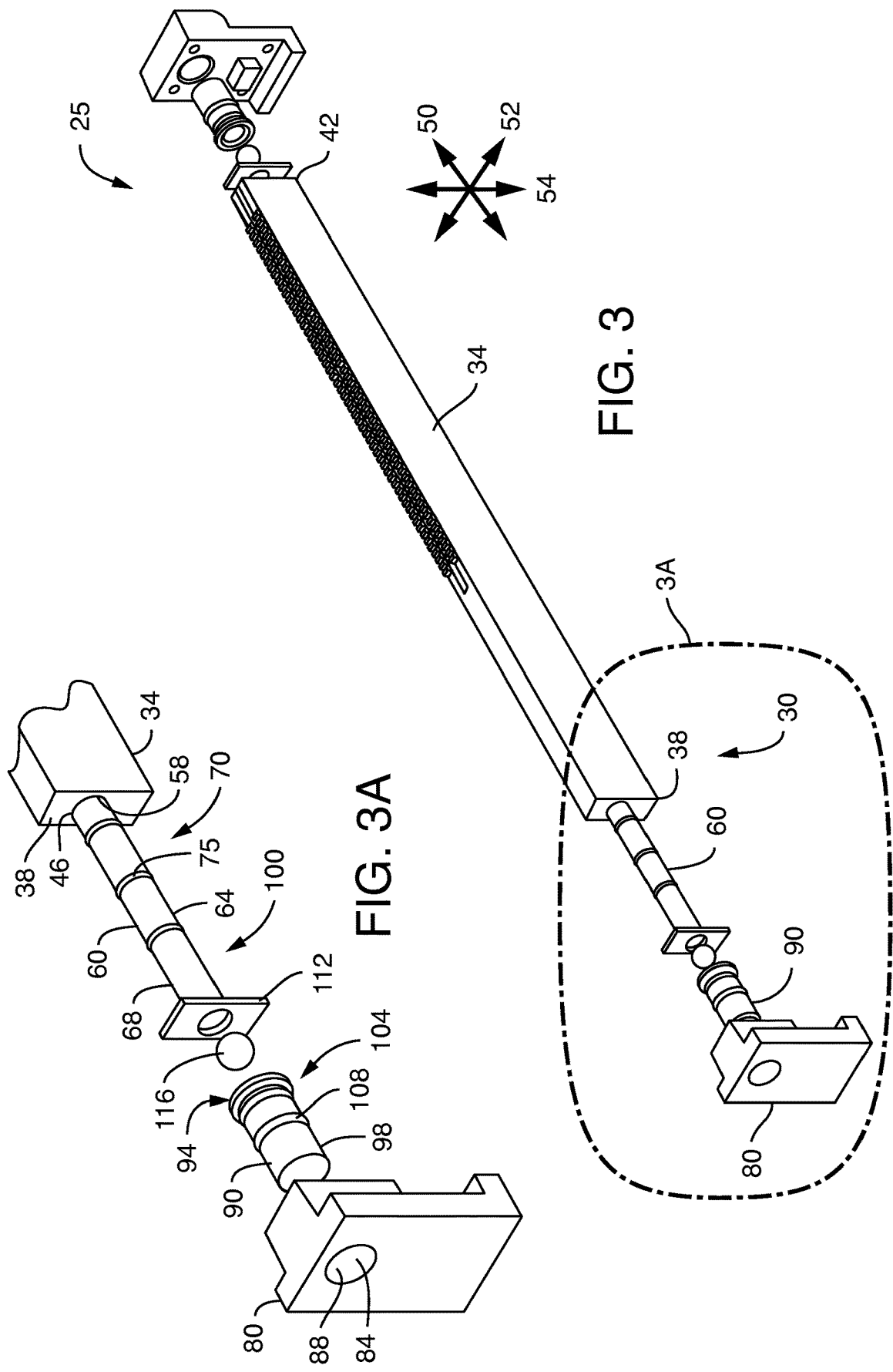

ULTRASONIC ANVIL HAVING LOW TRANSMISSIBILITY

BACKGROUND

This disclosure relates to apparatus and methods for applying thermal energy to work pieces, such as for bonding, sealing, cutting and the like of the work pieces. More particularly, the present disclosure relates to an apparatus and method for applying ultrasonic energy to work pieces such as disposable diapers, training pants, feminine care products, feminine care and incontinence garments, or the like.

Use of mechanical vibration produced at an ultrasonic frequency to weld thermoplastics, and to emboss and form plastics is a well-established industrial process. The physical principles underlying this technology have important relations to the disclosure described herein and therefore merit brief review and discussion.

To obtain significant vibrational motion, most ultrasonic systems are operated at one of their frequencies of resonance. Both the ultrasonic generator and the ultrasonic horn are designed to resonate at the same frequency, in which case the vibration produced by the generator is communicated to the horn. Because the horn is tuned to the same frequency as the generator, the horn expands and contracts along its length in concert with the imposed motion of the vibration generator.

The motion produced at the free face of the horn is then reciprocal, or back and forth in a surface perpendicular to the surface of the horn, with an amplitude determined by the electrical voltage applied to the crystals of the vibration generator. It is known to condition the vibrations produced by the generator before the vibrations are communicated to the horn, including incorporating amplification devices and phase change devices into the sequence of elements so used.

Bond strengths are a closely monitored quality target in, for example, personal care articles such as adult incontinence products. A particular bond of concern is the side seam bond in such articles. Side seam bonding has historically been plagued by periods of low average bond strengths and high bond strength variability. Solid modeling and lab testing has shown that the anvils used in current processes have resonant frequencies close to the side seam bonder's ultrasonic operating frequency. When the ultrasonic operating frequency is close to an anvil resonance frequency, the anvil vibrates in ways that generally are detrimental to bond strength (higher variability, lower bonding effectiveness), generator power requirements, generator operating stability, ultrasonic component reliability, and ultrasonic component longevity.

SUMMARY

An anvil system with a resonance frequency sufficiently below the ultrasonic operating frequency would lead to lower bond strength variability, increased bonding effectiveness, consistently higher mean strength, lower down time due to generator faults, and greater mean time between ultrasonic system component failures. The anvil system of the present disclosure is an anvil system with natural frequencies substantially lower than the ultrasonic operating frequency.

The present disclosure is generally directed to an anvil system for use in an ultrasonic bonder, the anvil system including an anvil assembly including an anvil bar having an axial direction, two anvil bar longitudinal ends, and an anvil aperture in at least one anvil bar longitudinal end, the anvil aperture having an anvil aperture inner surface, a shaft separate from the anvil bar and partially disposed in the anvil aperture, the shaft having a circumferential surface and extending outwardly beyond the anvil bar longitudinal end, and a first elastomeric shaft O-ring disposed on the shaft between the shaft circumferential surface and the anvil aperture inner surface; a first mounting bracket with a first mounting bracket hole therein, the mounting bracket hole having a hole surface; a first bushing disposed in the first mounting bracket hole and sized to accommodate an end of the shaft, the first bushing having a bushing inner surface and a bushing outer surface; and a second elastomeric shaft O-ring disposed on the shaft between the shaft circumferential surface and the bushing inner surface.

The present disclosure is also directed to an anvil system for use in an ultrasonic bonder, the anvil system including an anvil assembly including an anvil bar having an axial direction, two anvil bar longitudinal ends, and an anvil aperture therethrough from one anvil bar longitudinal end to the other anvil bar longitudinal end, the anvil aperture having an anvil aperture inner surface, a shaft separate from the anvil bar and partially disposed within the anvil aperture, the shaft having a shaft circumferential surface and extending outwardly beyond both anvil bar longitudinal ends, and a shaft isolation system disposed between the shaft circumferential surface and the anvil aperture inner surface; a first mounting bracket with a first mounting bracket hole therein, the first mounting bracket hole having a hole surface; a first bushing disposed in the first mounting bracket hole and sized to accommodate an end of the shaft, the first bushing having a bushing inner surface and a bushing outer surface; and a first mount isolation system disposed between the shaft circumferential surface and the bushing inner surface.

The present disclosure is further directed to a method for reducing the natural frequency of an anvil bar in an ultrasonic bonder, the method including producing an anvil bar-shaft combination, the anvil bar having an axial direction, two anvil bar longitudinal ends, and an anvil aperture therethrough from one anvil bar longitudinal end to the other anvil bar longitudinal end, the anvil aperture having an anvil aperture inner surface, and the shaft being separate from the anvil bar and partially disposed within the anvil aperture, the shaft having a shaft circumferential surface and extending outwardly beyond both anvil bar longitudinal ends; disposing a shaft isolation system between the shaft circumferential surface and the anvil aperture inner surface; mounting the anvil bar-shaft combination in a first mounting bracket having a first mounting bracket hole using a first bushing disposed in the first mounting bracket hole, the first mounting bracket hole having a hole surface and the first bushing having a bushing inner surface and a bushing outer surface; and disposing a first mount isolation system between the bushing inner surface and the shaft circumferential surface.

Other features and aspects of the present disclosure are discussed in greater detail herein.

BRIEF DESCRIPTION OF THE DRAWINGS

The present disclosure will be more fully understood, and further features will become apparent, when reference is made to the following detailed description and the accompanying drawings. The drawings are merely representative and are not intended to limit the scope of the claims.

FIG. 3 is an exploded perspective view of an anvil assembly of the present disclosure illustrating internal parts;

Figure 1:
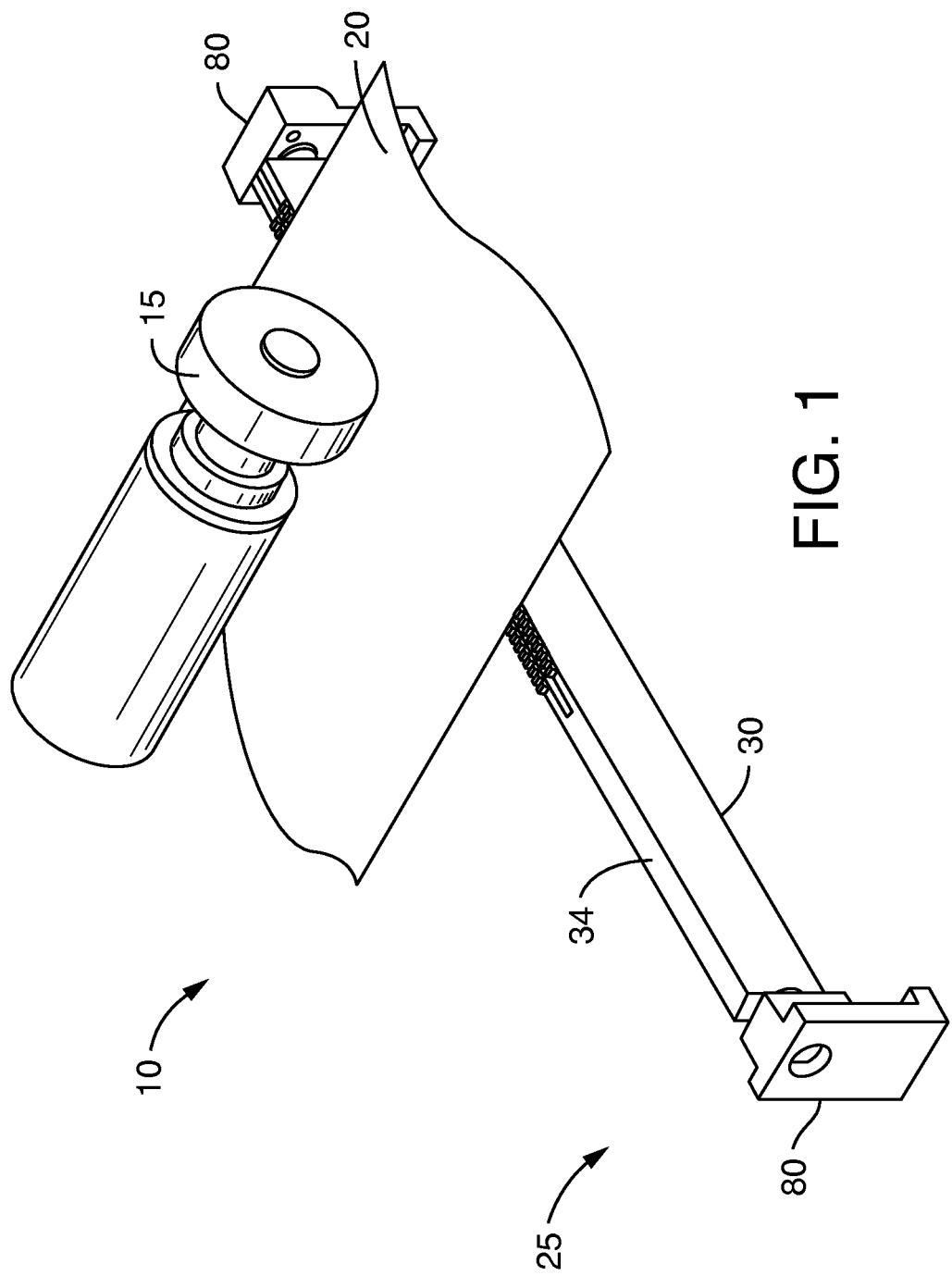
FIG. 1 is a schematic view illustrating the general arrangement of an ultrasonic horn and anvil for one station of an ultrasonic bonder.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

It is to be understood by one of ordinary skill in the art that the present discussion is a description of exemplary aspects only, and is not intended as limiting the broader aspects of the present disclosure.

A current side seam bonder is described in U.S. Pat. Nos. 5,667,608 and 5,660,679 to Rajala et al., which are incorporated by reference herein to the extent they do not conflict herewith. The bonder includes six stations evenly spaced about a circle with each station containing an ultrasonic bonder having anvils that work in conjunction with ultrasonic horns to create cross-direction bonds on a continuous web or webs of material. The general arrangement of such a horn/anvil pair is illustrated in FIG. 1. The ultrasonic bonder 10 has a sonic horn 15 that traverses forth and back across the width of the web 20 to form bonds transverse to the web direction. The anvil assembly 30 pivots on journals that are supported in bushings mounted to the drum structure (not shown). Each anvil bar 34 can be a rectangular steel bar with shaft journals projecting out of each end. The anvil bar 34 on the side seam bonder in current designs is supported on journals that are integral to the anvil bar 34. The journals are supported in shaft bushings that are part of mounting brackets 80 rigidly bolted to the side seam bonder drum structure. The anvil journals are supported by the shaft bushings to allow the anvil assembly 30 the freedom to pivot and align with the sonic horn 15. The problem with current anvils is that they are very stiff compared to their mass. The stiffness of the current anvil system configuration and the mass of the anvil combine to produce an anvil with a fundamental resonant frequency greater than 500 Hz, with harmonics that extend into the tens-of-thousands of Hz. The anvils therefore have vibration modes that are close to the ultrasonic horn operating frequency.

When the sonic horn touches the current anvil system, the anvil vibrates with amplitudes equaling that of the sonic horn but not necessarily in phase with the sonic horn. This results in the power and operating frequency of the sonic generator varying to the point that the generator sometimes overloads and shuts down. This high degree of power and frequency variability also makes for poor bond quality because the power output by the generator is not necessarily going into doing the useful work of bonding but instead is going into generating heat in the system components.

Figure 2:
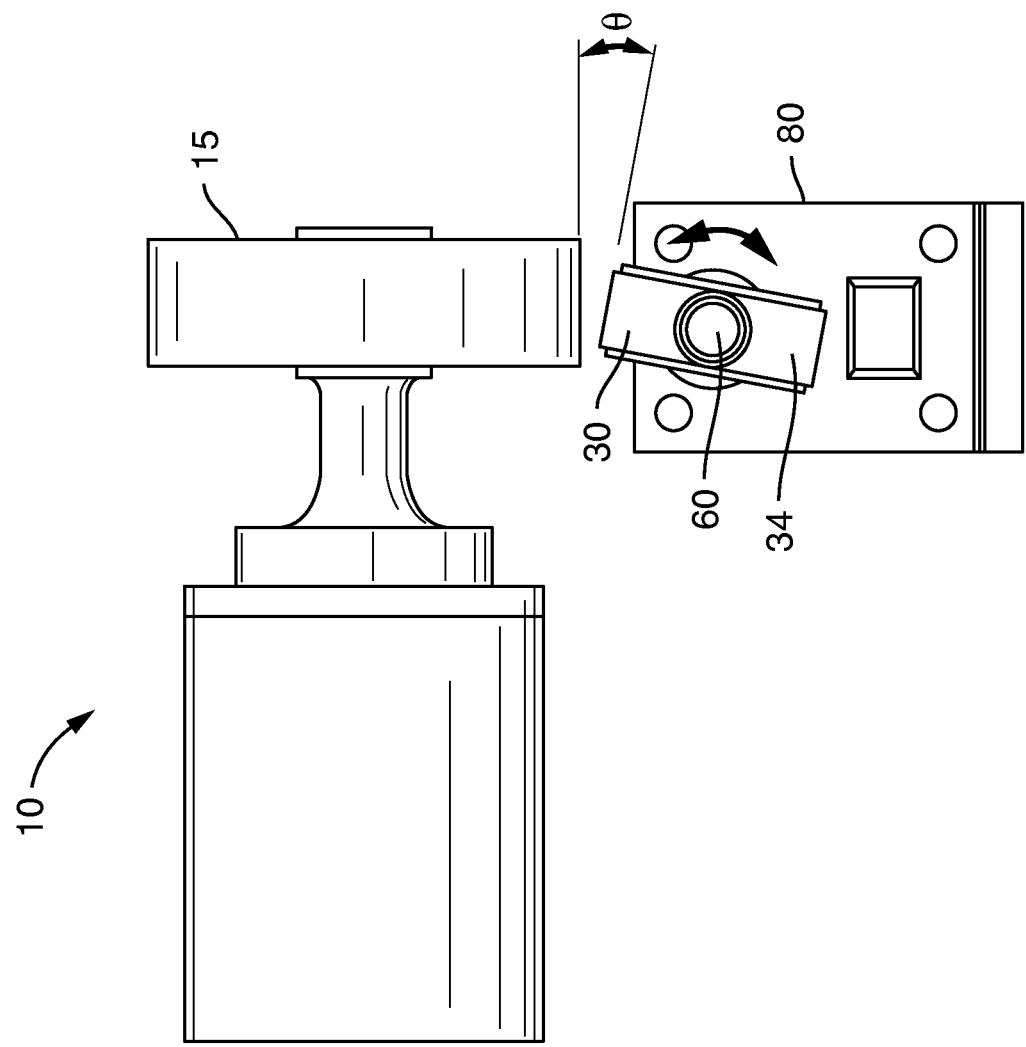
FIG. 2 is an elevation view illustrating a self-aligning feature of the anvil assembly of FIG. 1.

An anvil system with a resonance frequency sufficiently below the ultrasonic operating frequency would lead to lower bond strength variability, increased bonding effectiveness, consistently higher mean strength, lower down time due to generator faults, and greater mean time between ultrasonic system component failures. The anvil system 25 of the present disclosure is an anvil system 25 with natural frequencies substantially lower than the ultrasonic operating frequency. The anvil system 25 also preserves the self-aligning feature of the prior anvil assemblies 30, as illustrated in FIG. 2.

The anvil system 25 of the present disclosure solves a long-standing problem within the side seam bonder, that of violent vibratory reaction of the anvil to horn vibration. This solution when combined with the pivoting self-aligning feature provides the potential to take the side seam bonder to higher levels of productivity. It should be noted that the system of isolation of the present disclosure for an ultrasonic bonder 10 can be used in conjunction with any desired bonding pattern.

The ideal situation would be to have an anvil that acted as though it is completely rigid without vibrating. This is possible in vibratory systems where, for example, a vibrating machine is resting on a base supported on springs. The mass of the machine combined with the compliance of the springs results in a mechanical system with a specific resonant frequency. If the machine is operated at a speed that produces vibrations at a frequency substantially higher than the system's resonant frequency, the machine will appear to be sitting on an immovable base. If the machine is operated at a frequency close to the support's resonant frequency, the support will vibrate wildly. If the machine is operated at a frequency much lower than resonance, the system will vibrate at the same amplitude and frequency as the input.

FIG. 3 shows the detail of the anvil system 25 of the present disclosure. The anvil system 25 includes an anvil assembly 30, where support for the anvil bar 34 is no longer integral with the anvil bar 34 itself. The anvil assembly 30 includes an anvil bar 34 having two anvil bar longitudinal ends 38, 42, an anvil aperture 46, and axial and radial directions 50, 54. The anvil aperture 46 extends partially into one or both anvil longitudinal ends 38, 42, and can extend through the entire length of the anvil bar 34 in the axial direction 50. The anvil aperture 46 includes an anvil aperture inner surface 58.

The anvil assembly 30 also includes at least one shaft 60 having a shaft circumferential surface 64 and two shaft ends 68. The shaft 60 has a shaft diameter smaller than the inner diameter of the anvil aperture 46 such that the shaft 60 can be placed at least partially within the anvil aperture 46 such that a portion of the shaft 60 extends beyond an anvil longitudinal end 38, 42. The shaft 60 can be one piece extending through the anvil aperture 46 and extending from both anvil bar longitudinal ends 38, 42, or the shaft 60 can be multiple pieces.

The anvil assembly 30 also includes a shaft isolation system 70 disposed between the anvil aperture inner surface 58 and the shaft circumferential surface 64. The shaft isolation system 70 can include one or more elastomeric shaft O-rings 75 mounted on the shaft between the shaft circumferential surface 64 and the anvil aperture inner surface 58. These shaft O-rings 75 isolate the shaft 60 from the anvil bar 34 to create a compliant connection that acts as a spring mount for the anvil bar 34.

The anvil system 25 also includes a mounting bracket 80 to provide an interface between the anvil assembly 30 and the side seam bonder. The mounting bracket 80 includes a mounting bracket hole 84 to receive a bushing 90 and the anvil assembly 30, where the mounting bracket hole 84 includes a hole surface 88. The bushing 90 includes a bushing inner surface 94 and a bushing outer surface 98. The anvil system 25 can also include first and second mount isolation systems 100, 104. In the first mount isolation system 100, an additional one or more elastomeric shaft O-rings 75 are mounted on the shaft 60 between the shaft circumferential surface 64 and the bushing inner surface 94. These shaft O-rings 75 isolate the shaft 60 from the bushing 90 to create a compliant connection that acts as a spring mount for the shaft 60.

Optionally, a second mount isolation system 104 includes bushing O-rings 108 mounted on the bushing 90 between the bushing outer surface 98 and the hole surface 88. These bushing O-rings 108 isolate the mounting bracket 80 from the bushing 90 to create a compliant connection that acts as a spring mount for the bushing 90.

The anvil system 25 can include an identical mounting bracket 80, bushing 90, and mount isolation systems 100, 104 arrangement on the opposite anvil bar longitudinal end 42, as illustrated in FIG. 3, or the opposite anvil bar longitudinal end 42 can include any suitable mounting system.

The anvil system 25 can also include an elastomeric washer 112 disposed around the shaft 60 between the anvil bar longitudinal end 38 and the mounting bracket 80 to provide a compliant connection between the anvil bar longitudinal end 38 and the mounting bracket 80. The washer 112 can be made from rubber or any other suitable material.

The anvil system 25 can also include an elastomeric ball 116 disposed within the bushing 90 adjacent the shaft end 68 to provide a compliant connection between the bushing 90 and the shaft 60. The ball 116 can be made from rubber or any other suitable material.

Removing the shaft 60 from being integral with the anvil bar 34 and adding the various elastomeric components results in the anvil bar 34 having a much lower natural frequency, on the order of less than 10,000 Hz including harmonics. By selection of the appropriate elastomeric components, the stiffness of the anvil bar support structure can be tuned such that, when combined with the mass of the anvil bar 34, the resonant frequency of the anvil bar 34 is about 1 percent to 10 percent of the ultrasonic operating frequency. As a result, the anvil bar 34 and the sonic horn 15 have different natural frequencies and do not couple.

To ensure the desired result of a reduced resonant frequency was achieved, a number of analyses and tests were conducted.

In the analyses, use was made of the formulas and coefficients used in computing the natural frequencies of a beam under various constraints. See, Harris, C. M. and Piersol A. G., *Shock And Vibration Handbook*, 5th ed., 2002 McGraw-Hill, p. 1.13. In this case, the formulas and coefficients for the first five natural frequencies for uniform beams under various support configurations were used. In this case, the beam is simply supported on each end. Table 1 shows the natural frequencies of the first five vibration modes for a freely vibrating steel beam of the dimensions of a typical anvil of the type described in the present disclosure.

$$f_n = \frac{A}{2\pi}\sqrt{\frac{EIg}{\gamma b h L^4}}$$

Where: $f_n$=Natural frequency of a beam given Coefficient A (Hz)
A=Mode shape coefficient (use coefficients for simple support)
E=Material's modulus of elasticity (206.8 GPa, steel)
I=Second moment of area of beam's cross-section (1.065×10$^{-7}$ m$^4$)
g=Gravity acceleration (9.8 m/sec$^2$)
γ=Weight density of beam material (7840 Kg/m$^3$)
b=Width of beam's cross-section (0.0159 m)
h=Height of beam's cross-section (0.0432 m)
L=Length of beam (0.5460 m)

TABLE 1

TYPICAL ANVIL NATURAL FREQUENCIES, VIBRATION MODES 1 TO 5.

| | Mode No. | | | | |
|---|---|---|---|---|---|
| | 1 | 2 | 3 | 4 | 5 |
| $A_{free}$ = | 22.4 | 31.7 | 121 | 200 | 298 |
| $f_n$ = | 766 | 1083 | 4136 | 6836 | 10185 Hz |

Effective spring constant of a uniformly loaded beam (e.g. under its own weight) at the middle of its length, L. Effective spring constant is minimum at the center of the beam.

$$K_{beam} = \frac{384}{5}\frac{EI}{L^3} = 10{,}388{,}260\;\frac{N}{m}\left(59{,}020\;\frac{lb}{in}\right)$$

Figure 4A:
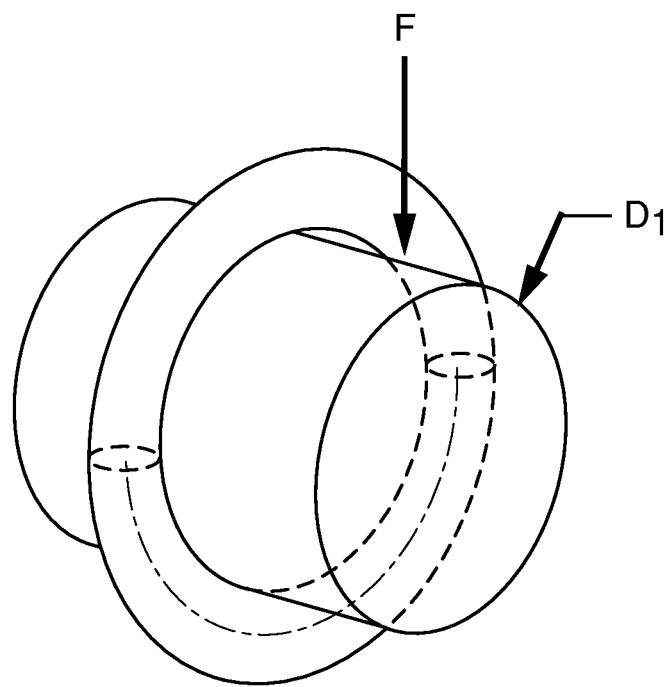
FIG. 4 is a schematic representation of the formula used to compute the effective spring constant of an O-ring in contact with a shaft.
Figure 4B:
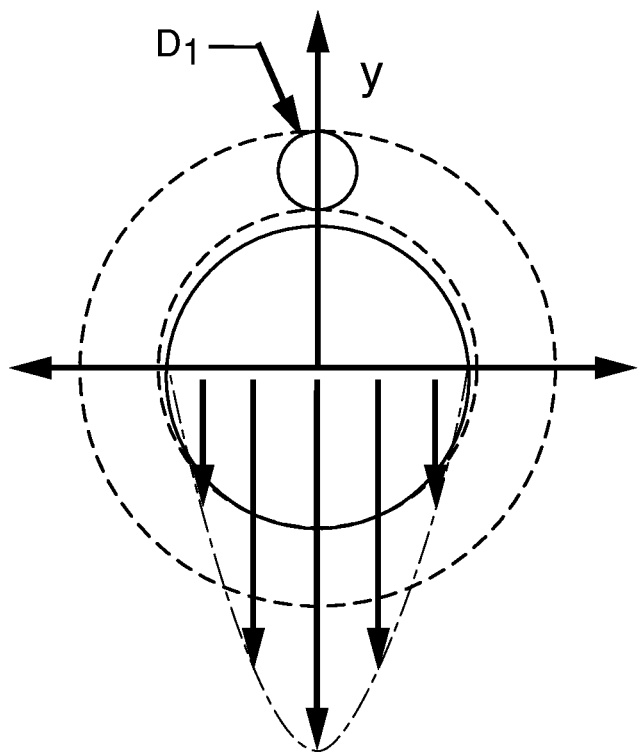

The stiffness of the O-ring mounts are more than an order of magnitude smaller than the bending stiffness of the anvil. Because of this, the anvil mounted on flexible O-rings tends to act as a rigid body of mass M. FIG. 4 schematically illustrates a steel shaft of diameter D1, being supported on an O-ring with a body diameter D2. The deflection y in the radial direction 54 represents the amount the shaft sinks into the O-ring when the anvil is loaded with a downward force F from the sonic horn.

Force as a function of y-deflection of O-Ring:

$$F = \frac{4}{3}E^* R_2^{1/2} y^{3/2}$$

Effective spring constant as a function of y-deflection of O-Ring:

$$K_e = \frac{dF}{dy} = \frac{1}{2}E^* R_2^{1/2} y^{1/2}$$

Where:

$$\frac{1}{E^*} = \frac{1-v_1^2}{E_1} + \frac{1-v_2^2}{E_2}$$

$$R_2 = \frac{D_2}{2}$$

E*=the Effective modulus of elasticity
$E_1$=modulus of elasticity of material number 1
$E_2$=modulus of elasticity of material number 2
$n_1$=Poisson's ratio for material number 1
$n_2$=Poisson's ratio for material number 2

Figure 5:
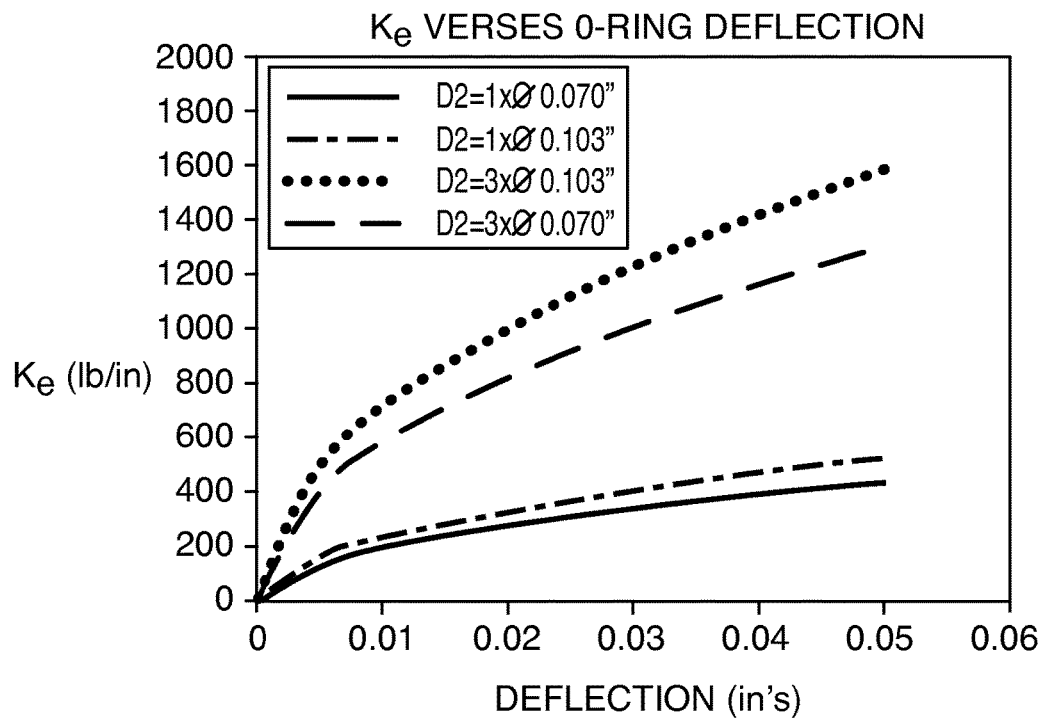
FIG. 5 is a graphical representation of the effective spring constants $K_e$ for a single O-ring and for three O-rings at two different O-ring sizes, in contact with a steel shaft.

FIG. 5 illustrates the effective spring constant of one or more O-rings when contacted by a steel shaft whose diameter is 10× greater than the deflections. One can see that the effective spring constants of even three (3) O-rings is much smaller than the effective spring constant at mid-span of the anvil modeled as a beam loaded by a uniformly distributed load; the uniformly distributed load being the beam's mass acted upon by an acceleration.

Figure 6:
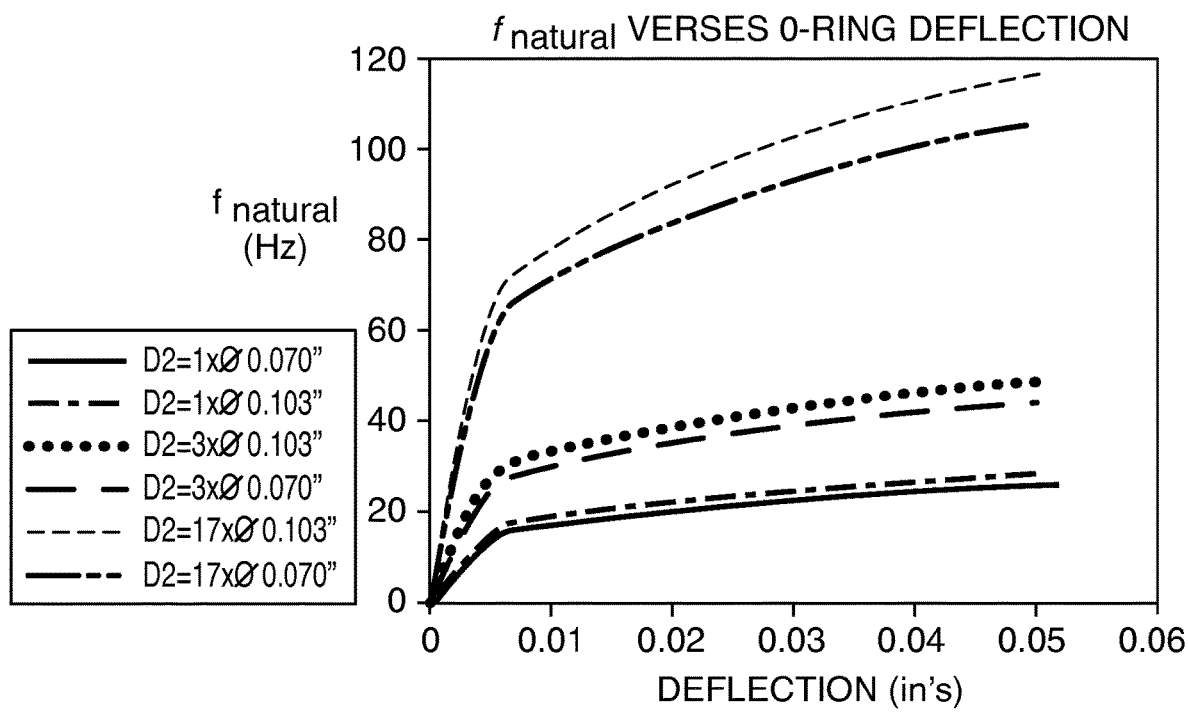
FIG. 6 is a graphical representation of the natural frequency $f_{natural}$ of an anvil assembly with one, three, and seventeen O-rings at two different O-ring sizes.

FIG. 6 illustrates the natural frequencies that result from the combination of the O-ring's effective spring constant and the mass of the rigid beam. FIG. 6 shows that even with seventeen O-rings, the natural frequency is still more than six times lower than the first mode natural frequency of the beam.

Figure 7:
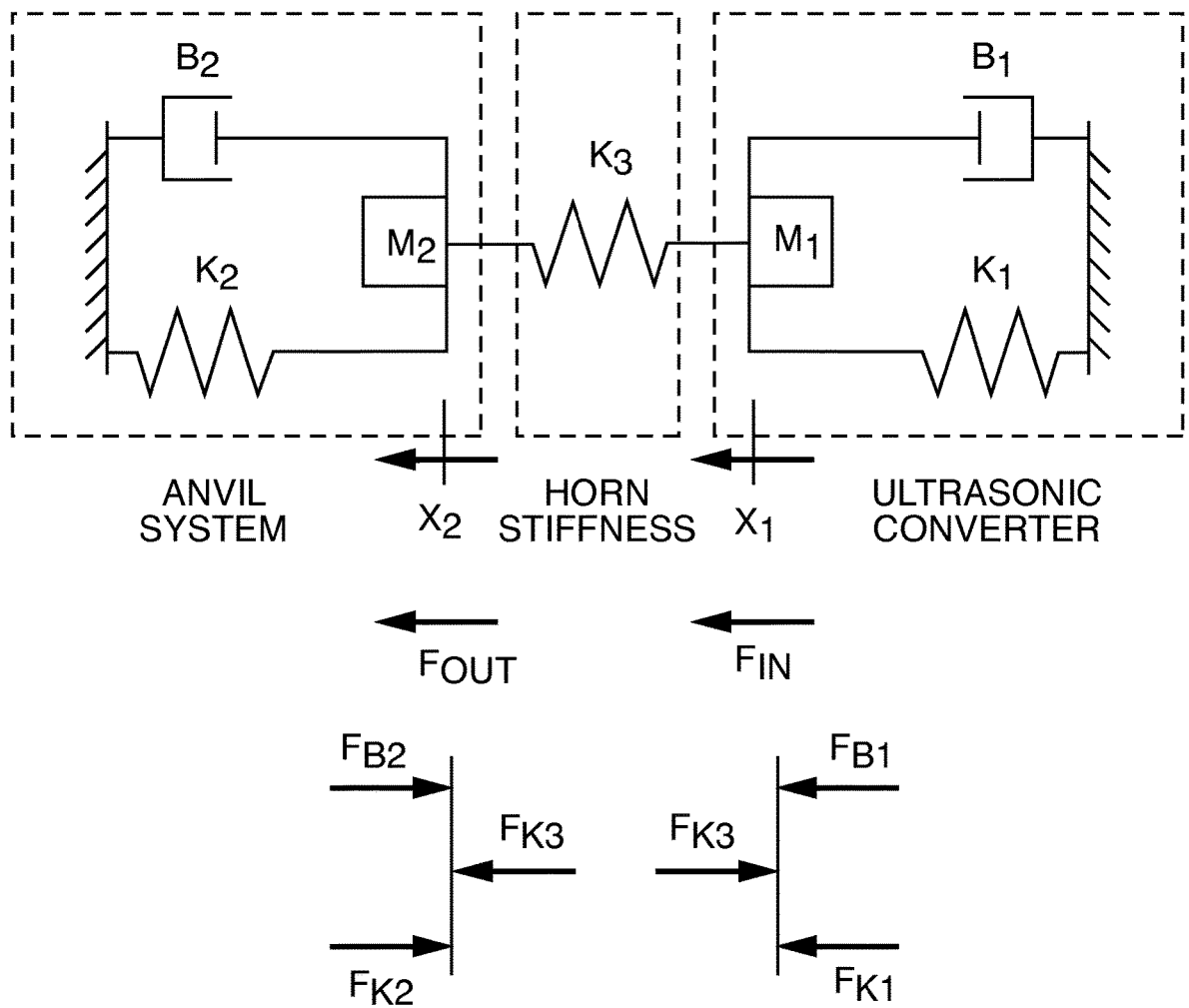
FIG. 7 is a schematic diagram of a lumped parameter mechanical system model of an ultrasonic converter, horn, and anvil.

FIG. 7 is a schematic of a lumped parameter mechanical model of an ultrasonic converter, horn, and anvil system. The converter when excited by an input voltage experiences a displacement X1. The converter displacement acts upon one end of the sonic horn, modeled here as a pure spring, which applies a force to the anvil that causes a displacement in the anvil X2. The output-over-input relationship in vibratory systems is termed the system's transmissibility. Transmissibility can be thought of as a measure of an object's response to an input displacement at a given frequency.

Figure 8:
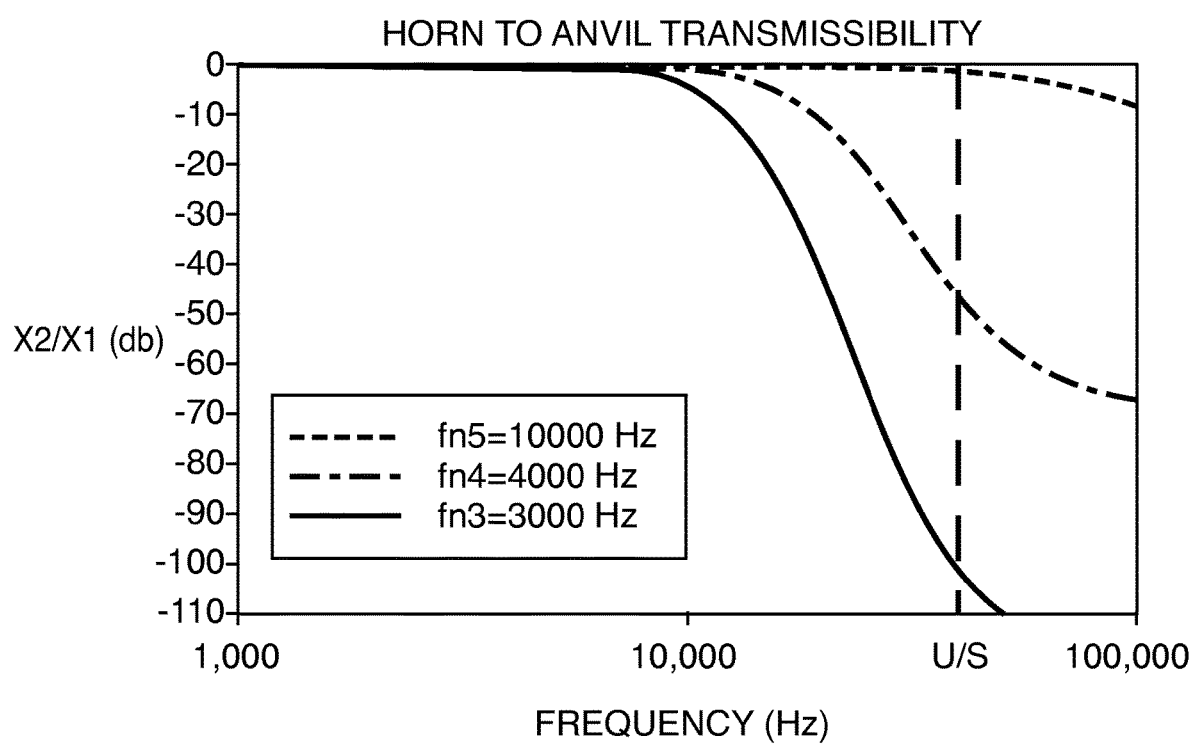
FIG. 8 is a frequency response plot of the relative magnitude of transmissibility: the anvil displacement to a given input displacement from a sonic horn and converter.

FIG. 8 is a transmissibility frequency response plot for an ultrasonic system having an anvil that naturally vibrates at: 3,000 Hz, 4,000 Hz, and 10,000 Hz. One can see that anvils with vibration mode frequencies above 10,000 Hz experience no attenuation when excited by a 40 KHz ultrasonic horn. FIG. 8 illustrates the fact that the anvil must not have frequency modes greater than about 10 percent of the operating frequency of the ultrasonic horn. A 40 KHz ultrasonic system with an O-ring supported anvil with 17 evenly spaced O-rings and a natural frequency of about 100 Hz will have harmonic frequencies, up to the $6^{th}$ harmonic, well below 10,000 Hz.

$$\frac{X_2(s)}{X_1(s)} = \frac{M_1(s^2 + 2\zeta_1\omega_{n1}s + \omega_{n1}^2)}{M_2(s^2 + 2\zeta_2\omega_{n2}s + \omega_{n2}^2)} \quad (6)$$

Where: $2\zeta_1\omega_{n1}=B_1/M_1$
$\omega_{n1}^2=K_1/M_1$, Resonant frequency of the converter=operating frequency
$\zeta_1=B_1/(2\sqrt{K_1M_1})$, Damping ratio of converter system, $\zeta>1$ highly damped, $\zeta<0.5$, lightly damped, $\zeta=0.7$ common.
$2\zeta_2\omega_{n2}=B_2/M_2$
$\zeta_{n2}^2=K_2M_2$, Resonant frequency of the anvil system
$\zeta_2=B_2/(2\sqrt{K_2M_2})$ Damping ratio of anvil system
$B_1$=Damping coefficient of ultrasonic converter (force*time/length)
$M_1$=Lumped mass of ultrasonic converter (force*time$^2$/length)
$K_1$=Spring constant of ultrasonic converter (force/length)
$f_{n1}$=Resonant frequency of the ultrasonic converter (corresponds to ultrasonic operating frequency) (cycles/sec)
$\omega_{n1}$=Resonant angular frequency of the ultrasonic converter ($w_{n1}=2pf_{n1}$) (radian/sec)
$\zeta_1$=Damping Ratio of ultrasonic converter, a dimensionless number
$B_2$=Damping coefficient of ultrasonic anvil (force*time/length)
$M_2$=Lumped mass of ultrasonic anvil (force*time$^2$/length)
$K_2$=Spring constant of ultrasonic anvil, $K_2=K_{beam}$ (force/length)
$f_{n2}$=Resonant frequency of the anvil (cycles/sec)
$\omega_{n2}$=Resonant angular frequency of the ultrasonic anvil ($w_{n2}=2pf_{n2}$) (radian/sec)
$\zeta_2$=Damping Ratio of ultrasonic anvil, a dimensionless number To use formula (6) one needs to know: the masses of the converter and anvil, the resonant frequencies of the converter and anvil, and an estimate of the damping ratios of the converter and anvil. The damping ratios of the ultrasonic converter and anvil are typically moderate to low, $\zeta_1, \zeta_2 \leq 0.7$.

In a first particular aspect, an anvil system for use in an ultrasonic bonder includes an anvil assembly including an anvil bar having an axial direction, two anvil bar longitudinal ends, and an anvil aperture in at least one anvil bar longitudinal end, the anvil aperture having an anvil aperture inner surface, a shaft separate from the anvil bar and partially disposed in the anvil aperture, the shaft having a circumferential surface and extending outwardly beyond the anvil bar longitudinal end, and a first elastomeric shaft O-ring disposed on the shaft between the shaft circumferential surface and the anvil aperture inner surface; a first mounting bracket with a first mounting bracket hole therein, the mounting bracket hole having a hole surface; a first bushing disposed in the first mounting bracket hole and sized to accommodate an end of the shaft, the first bushing having a bushing inner surface and a bushing outer surface; and a second elastomeric shaft O-ring disposed on the shaft between the shaft circumferential surface and the bushing inner surface.

A second particular aspect includes the first particular aspect, further comprising an elastomeric bushing O-ring disposed on the first bushing between the bushing outer surface and the hole surface.

A third particular aspect includes the first and/or second aspect, wherein the anvil aperture extends from one anvil bar longitudinal end to the other anvil bar longitudinal end, and wherein the shaft extends through the anvil aperture and beyond both anvil bar longitudinal ends.

A fourth particular aspect includes one or more of aspects 1-3, further comprising a second mounting bracket disposed at the anvil bar longitudinal end opposite the first mounting bracket, the second mounting bracket having a second mounting bracket hole therein.

A fifth particular aspect includes one or more of aspects 1-4, further comprising a second bushing disposed in the second mounting bracket hole and sized to accommodate an end of the shaft, wherein the second bushing has a second bushing inner surface and a second bushing outer surface.

A sixth particular aspect includes one or more of aspects 1-5, further comprising a third elastomeric shaft O-ring disposed on the shaft between the shaft circumferential surface and the second bushing inner surface.

A seventh particular aspect includes one or more of aspects 1-6, further comprising an elastomeric washer disposed around the shaft between the anvil bar longitudinal end and the first mounting bracket.

An eighth particular aspect includes one or more of aspects 1-7, further comprising an elastomeric ball disposed within the first bushing adjacent an end of the shaft.

A ninth particular aspect includes one or more of aspects 1-8, wherein the anvil bar is configured to be movable in a radial direction relative to the shaft.

A tenth particular aspect includes one or more of aspects 1-9, wherein the anvil bar is configured to pivot rotationally relative to the mounting bracket.

In an eleventh particular aspect, an anvil system for use in an ultrasonic bonder includes an anvil assembly including an anvil bar having an axial direction, two anvil bar longitudinal ends, and an anvil aperture therethrough from one anvil bar longitudinal end to the other anvil bar longitudinal end, the anvil aperture having an anvil aperture inner surface, a shaft separate from the anvil bar and partially disposed within the anvil aperture, the shaft having a shaft circumferential surface and extending outwardly beyond both anvil bar longitudinal ends, and a shaft isolation system disposed between the shaft circumferential surface and the anvil aperture inner surface; a first mounting bracket with a first mounting bracket hole therein, the first mounting bracket hole having a hole surface; a first bushing disposed in the first mounting bracket hole and sized to accommodate an end of the shaft, the first bushing having a bushing inner surface and a bushing outer surface; and a first mount isolation system disposed between the shaft circumferential surface and the bushing inner surface.

A twelfth particular aspect includes the eleventh particular aspect, further comprising a second mount isolation system disposed on the first bushing between the bushing outer surface and the hole surface of the first mounting bracket hole.

A thirteenth particular aspect includes the eleventh and/or the twelfth aspects, wherein the shaft isolation system includes at least one elastomeric O-ring disposed on the shaft.

A fourteenth particular aspect includes one or more of aspects 11-13, wherein the first mount isolation system includes at least one elastomeric O-ring disposed on the shaft.

A fifteenth particular aspect includes one or more of aspects 11-14, further comprising an elastomeric washer disposed around the shaft between the anvil bar longitudinal end and the first mounting bracket.

In a sixteenth particular aspect, a method for reducing the natural frequency of an anvil bar in an ultrasonic bonder includes producing an anvil bar-shaft combination, the anvil bar having an axial direction, two anvil bar longitudinal ends, and an anvil aperture therethrough from one anvil bar longitudinal end to the other anvil bar longitudinal end, the anvil aperture having an anvil aperture inner surface, and the shaft being separate from the anvil bar and partially disposed within the anvil aperture, the shaft having a shaft circumferential surface and extending outwardly beyond both anvil bar longitudinal ends; disposing a shaft isolation system between the shaft circumferential surface and the anvil aperture inner surface; mounting the anvil bar-shaft combination in a first mounting bracket having a first mounting bracket hole using a first bushing disposed in the first mounting bracket hole, the first mounting bracket hole having a hole surface and the first bushing having a bushing inner surface and a bushing outer surface; and disposing a first mount isolation system between the bushing inner surface and the shaft circumferential surface.

A seventeenth particular aspect includes the sixteenth particular aspects, further comprising disposing a second mount isolation system between the bushing outer surface and the hole surface.

An eighteenth particular aspect includes the sixteenth and/or seventeenth aspects, wherein the second mount isolation system includes at least one elastomeric O-ring disposed on the bushing outer surface.

A nineteenth particular aspect includes one or more of aspects 16-18, wherein the shaft isolation system and the first mount isolation system each include at least one elastomeric O-ring disposed on the shaft.

A twentieth particular aspect includes one or more of aspects 16-19, wherein the ultrasonic bonder has an operating frequency, and wherein the natural frequency of the anvil bar is less than or equal to 10 percent of the operating frequency These and other modifications and variations to the present disclosure can be practiced by those of ordinary skill in the art, without departing from the spirit and scope of the present disclosure, which is more particularly set forth in the appended claims. In addition, it should be understood that elements of the various aspects can be interchanged both in whole and in part. Furthermore, those of ordinary skill in the art will appreciate that the foregoing description is by way of example only, and is not intended to limit the disclosure so further described in such appended claims.

What is claimed:

1. An anvil system for use in an ultrasonic bonder, the anvil system comprising:
   an anvil assembly including
      an anvil bar having an axial direction, two anvil bar longitudinal ends, and an anvil aperture in at least one anvil bar longitudinal end, the anvil aperture having an anvil aperture inner surface,
      a shaft separate from the anvil bar and partially disposed in the anvil aperture, the shaft having a circumferential surface and extending outwardly beyond the anvil bar longitudinal end, and
      a first elastomeric shaft O-ring disposed on the shaft between the shaft circumferential surface and the anvil aperture inner surface;
   a first mounting bracket with a first mounting bracket hole therein, the mounting bracket hole having a hole surface;
   a first bushing disposed in the first mounting bracket hole and sized to accommodate an end of the shaft, the first bushing having a bushing inner surface and a bushing outer surface; and
   a second elastomeric shaft O-ring disposed on the shaft between the shaft circumferential surface and the bushing inner surface.

2. The anvil system of claim 1, further comprising an elastomeric bushing O-ring disposed on the first bushing between the bushing outer surface and the hole surface.

3. The anvil system of claim 1, wherein the anvil aperture extends from one anvil bar longitudinal end to the other anvil bar longitudinal end, and wherein the shaft extends through the anvil aperture and beyond both anvil bar longitudinal ends.

4. The anvil system of claim 1, further comprising a second mounting bracket disposed at the anvil bar longitudinal end opposite the first mounting bracket, the second mounting bracket having a second mounting bracket hole therein.

5. The anvil system of claim 4, further comprising a second bushing disposed in the second mounting bracket hole and sized to accommodate an end of the shaft, wherein the second bushing has a second bushing inner surface and a second bushing outer surface.

6. The anvil system of claim 5, further comprising a third elastomeric shaft O-ring disposed on the shaft between the shaft circumferential surface and the second bushing inner surface.

7. The anvil system of claim 1, further comprising an elastomeric washer disposed around the shaft between the anvil bar longitudinal end and the first mounting bracket.

8. The anvil system of claim 1, further comprising an elastomeric ball disposed within the first bushing adjacent an end of the shaft.

9. The anvil system of claim 1, wherein the anvil bar is configured to be movable in a radial direction relative to the shaft.

10. The anvil system if claim 1, wherein the anvil bar is configured to pivot rotationally relative to the mounting bracket.

11. An anvil system for use in an ultrasonic bonder, the anvil system comprising:
an anvil assembly including
an anvil bar having an axial direction, two anvil bar longitudinal ends, and an anvil aperture therethrough from one anvil bar longitudinal end to the other anvil bar longitudinal end, the anvil aperture having an anvil aperture inner surface,
a shaft separate from the anvil bar and partially disposed within the anvil aperture, the shaft having a shaft circumferential surface and extending outwardly beyond both anvil bar longitudinal ends, and
a shaft isolation system disposed between the shaft circumferential surface and the anvil aperture inner surface;
a first mounting bracket with a first mounting bracket hole therein, the first mounting bracket hole having a hole surface;
a first bushing disposed in the first mounting bracket hole and sized to accommodate an end of the shaft, the first bushing having a bushing inner surface and a bushing outer surface; and
a first mount isolation system disposed between the shaft circumferential surface and the bushing inner surface.

12. The anvil system of claim 11, further comprising a second mount isolation system disposed on the first bushing between the bushing outer surface and the hole surface of the first mounting bracket hole.

13. The anvil system of claim 11, wherein the shaft isolation system includes at least one elastomeric O-ring disposed on the shaft.

14. The anvil system of claim 11, wherein the first mount isolation system includes at least one elastomeric O-ring disposed on the shaft.

15. The anvil system of claim 11, further comprising an elastomeric washer disposed around the shaft between the anvil bar longitudinal end and the first mounting bracket.

16. A method for reducing the natural frequency of an anvil bar in an ultrasonic bonder comprising:
producing an anvil bar-shaft combination, the anvil bar having an axial direction, two anvil bar longitudinal ends, and an anvil aperture therethrough from one anvil bar longitudinal end to the other anvil bar longitudinal end, the anvil aperture having an anvil aperture inner surface, and the shaft being separate from the anvil bar and partially disposed within the anvil aperture, the shaft having a shaft circumferential surface and extending outwardly beyond both anvil bar longitudinal ends;
disposing a shaft isolation system between the shaft circumferential surface and the anvil aperture inner surface;
mounting the anvil bar-shaft combination in a first mounting bracket having a first mounting bracket hole using a first bushing disposed in the first mounting bracket hole, the first mounting bracket hole having a hole surface and the first bushing having a bushing inner surface and a bushing outer surface; and
disposing a first mount isolation system between the bushing inner surface and the shaft circumferential surface.

17. The method of claim 16, further comprising disposing a second mount isolation system between the bushing outer surface and the hole surface.

18. The method of claim 17, wherein the second mount isolation system includes at least one elastomeric O-ring disposed on the bushing outer surface.

19. The method of claim 16, wherein the shaft isolation system and the first mount isolation system each include at least one elastomeric O-ring disposed on the shaft.

20. The method of claim 16, wherein the ultrasonic bonder has an operating frequency, and wherein the natural frequency of the anvil bar is less than or equal to 10 percent of the operating frequency.

* * * * *